Dec. 15, 1959   B. G. DI SALVO   2,916,833
COLOR GUIDE AND HARMONY SELECTOR
Filed Nov. 23, 1956   2 Sheets-Sheet 2

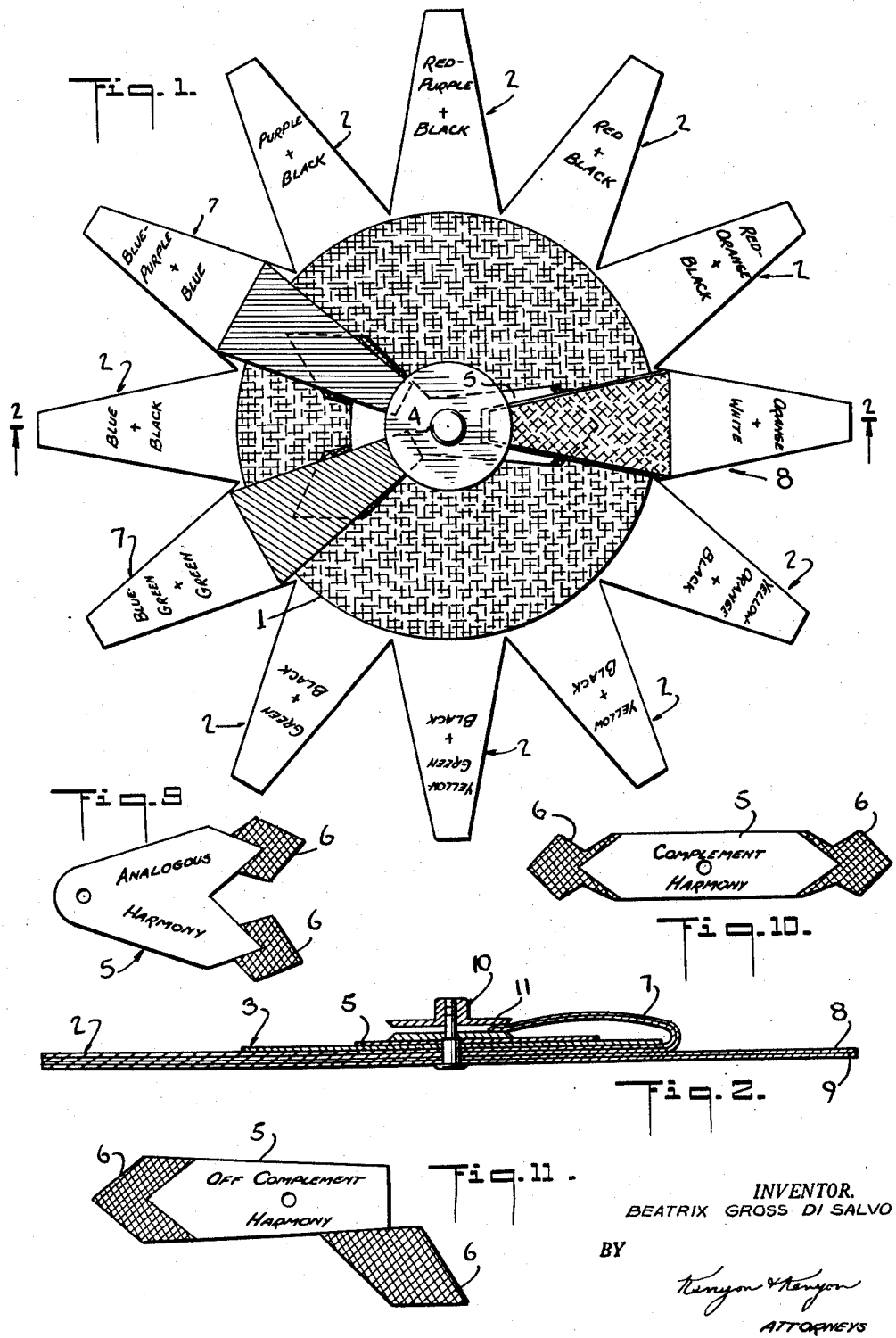

INVENTOR.
BEATRIX GROSS
DI SALVO
BY
Kenyon & Kenyon
ATTORNEYS

# United States Patent Office 2,916,833
Patented Dec. 15, 1959

2,916,833

COLOR GUIDE AND HARMONY SELECTOR

Beatrix Gross Di Salvo, Bronxville, N.Y.

Application November 23, 1956, Serial No. 623,851

6 Claims. (Cl. 35—28.3)

The present invention relates to devices for selecting colors, and more particularly to a combination color guide and harmony selector which mechanically coordinates fundamental color information.

In recent years the advent of color photography, and fabrics and paints with numerous gradations of tints, shades and tones, has created a need for a device which will permit the choice of colors that enhance each other when used together. To one skilled in the art of color selection this selection procedure is possible, but to the unskilled person this selection process is virtually insurmountable without the aid of mechanical devices.

Radiant light energy as it is known today has many measurable wave lengths, each of these wave lengths providing a different color when it is dispersed by a prism or defraction grating. In this respect the eye also functions as a prism and distinguishes many wave lengths as different colors. Color as we note it, therefore, is radiant light energy and color vision or perception results from stimuation of the eye by radiant light energy. A feature common to all prior art color guides and selectors is that they contain a movable indicator which may be varied to select various color combinations on a dail. In these prior art devices, however, all of the colors from which a selection is to be made are visible to the eye and, therefore, the perception of the colors viewed is altered and interfered with by the presence of the surrounding colors.

In view of the foregoing, it is one object of the present invention to provide a color guide and harmony selector in which only those colors are visible which will form a color harmony.

More specifically, it is an object of this invention to provide a device which will permit the selection of harmonious colors without any previous knowledge of colors.

Another object is to provide a device which will permit the selection and determination of the percentage of optical visiblity of a particular color or color combination as it is seen by the human eye.

Yet another object of this invention is to provide a device which will enable a color to be coordinated with its identifying wave length and its percentage of optical visibility. These and other features and objects of the invention will be more clearly understood from the following description and from the accompanying drawings in which:

Figure 1 is a top view showing the device in its assembled and operative position;

Figure 2 is a cross-section taken on lines 2—2 of Figure 1, illustrating one manner in which the fingers may be bent inwardly over the disc and retained in position;

Figure 9 is a top view of another form of indicating element for selecting analogous harmony colors;

Figure 10 is a top view of another form of indicating element for selecting complement harmony colors, and Figure 11 is a top view of another form of indicating element for selecting off-complement harmony colors.

Figure 4:
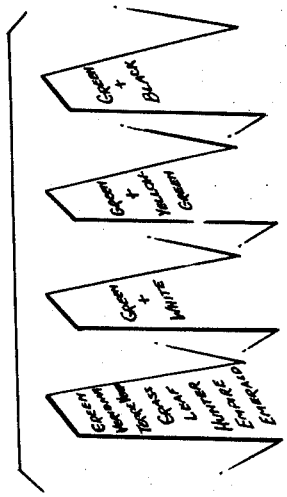
Figure 4 is a perspective view of a group of the fingers illustrated in Figure 1, illustrating indicia markings that may be applied thereto.
Figure 3:
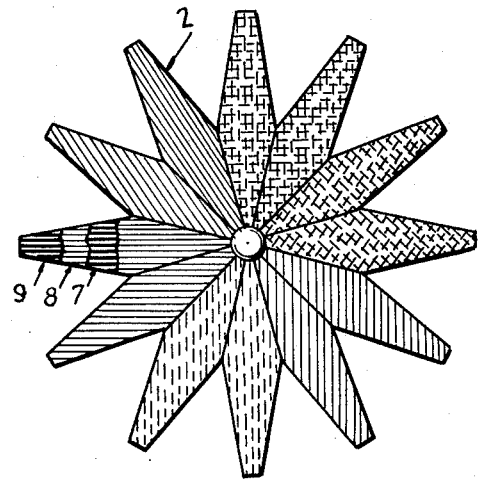
Figure 3 is a bottom view of one of the discs illustrated in Figures 1 and 2.
Figure 5:
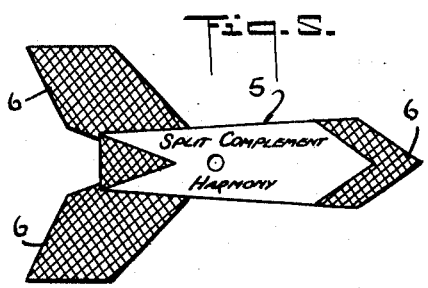
Figure 5 is a top view of one form of indicating element for selecting split complement harmony colors.
Figure 6:
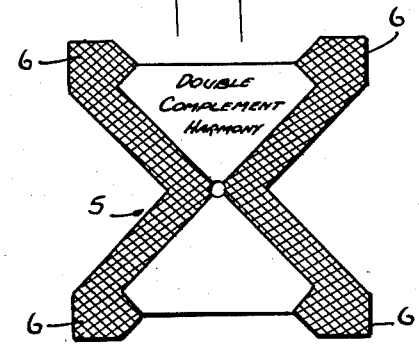
Figure 6 is a top view of another indicating element for selecting double complement harmony colors.
Figure 7:
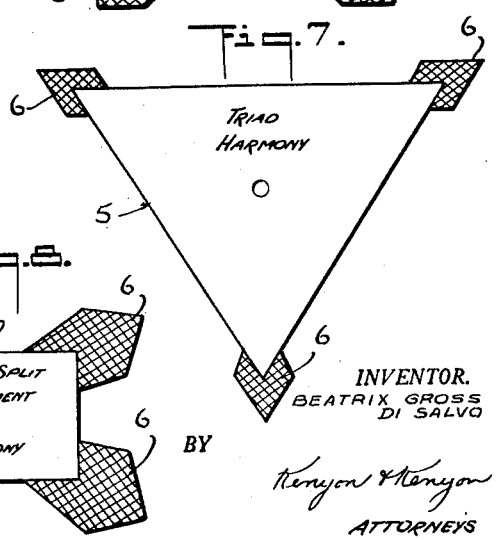
Figure 7 is a top view of another form of indicating element for selecting triad harmony colors.
Figure 8:
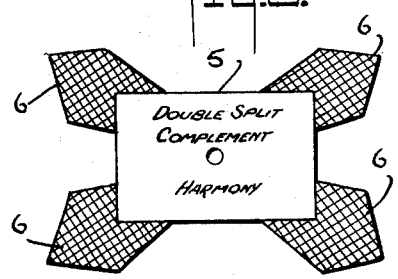
Figure 8 is a top view of another form of indicating element for selecting double split complement harmony colors.

The color guide and harmony selector of the present invention includes a disc 1 with a plurality of fingers 2 extending radially from the disc 1. The disc 1 and fingers 2 may be formed integrally as, for example, by stamping or punching or the fingers 2 may be attached to the disc 1 in any suitable manner. The fingers 2 or that portion of the fingers adjacent to the outer periphery of the disc 1 should be fabricated from a material which will permit the fingers 2 to be flexed over the disc 1 without shearing or tearing the fingers away from the disc. A background disc 3 may be removably attached to the top face of the disc 1 in any suitable manner as, for example, by a pin 4 passing through the center of the disc 1 and the background disc 3. The peripheral contour of the background disc 3 is preferably the same as the peripheral contour of the disc 1 so that when the disc 3 is in position on the disc 1 it completely covers the disc 1. The disc 1 and the background disc 3 are preferably circular, although they may take any other desired shape.

An indicator 5 which has two or more extending pointers 6 is removably attached to the disc 1, as by the pin 4 and in such a manner as to be rotatable about the center of the disc 1. These indicating elements 5 may take a multiplicity of configurations for a purpose to be presently described.

In the device illustrated in Figure 1, the disc 1 is provided with twelve radially extending fingers 2. These fingers are spaced equi-distant from one another and in the form illustrated the center line of each finger is spaced 30° from the center line of each adjacent finger. As mentioned previously, color vision or perception results from stimulation of our eyes by radiant light energy and in selecting colors for a design, for example, it is important that only those colors be viewed that form the color harmony. If other colors are present it tends to detract or interfere with the perception of the colors being viewed. This selection is made possible in the device of the present invention without detraction from surrounding colors, by placing the colors on the reverse side of the fingers or on the side of the fingers facing away from the top face of the disc 1. The back face of each finger is covered with a different color or color combination and in the device illustrated in Figure 1, twelve colors are therefore presented, one color on the back face of each finger 2. The colors on the back of the fingers 2 are arranged in a twelve-color spectrum. If it is desired, additional discs may be securely affixed to the reverse side of the disc 1 in a multi-ply stack, with the fingers 7, 8, 9 of these additional discs containing colors corresponding to the spectrum colors on the fingers 2. A configuration of this type is illustrated in Figures 1 and 2 with three additional discs shown as being sequentially disposed beneath the disc 1, thus permitting color harmonies to be selected from among 48 colors. Each color may be shown alone over white or over other types of backgrounds. Harmonies are usually shown over the white disc 1, the disc 3 being utilized only when a background color is desired. Tints may be shown by mixing the color with white while shades may be shown by mixing the colors with black.

As one example of a color grouping for the fingers sequentially disposed beneath each other, the series of sequentially disposed fingers labeled blue plus black in Figure 1 may be taken as an example. The top finger 2 may be a shade of blue or blue mixed with black and the finger 7 below this may be blue plus blue-green or a spectrum color. The following finger 8 may be blue mixed with white or a tint, while the lowermost finger 9 may be a blue spectrum color.

In the device described, therefore, color harmonies may be selected from among 48 colors but these colors are hidden from view until they are moved into visible position by bending the fingers over and upon the disc 1. In order to retain their position once they are bent inwardly over the disc 1, the fingers may either be made of flexible material which will retain the position to which they are adjusted, or else a means may be provided on the disc 1 for retaining the fingers in this displaced position. This securing means may in one form consist of a clamp 10 which is located at the center of the disc 1 and which contains spring biased plates 11 to securely hold the edges of the fingers when they are bent inwardly over the disc 1, or it may take the form of a clamp that is threadedly secured to the pin 4 which passes through the multi-ply stack of discs and the indicator 5. It is to be understood that any suitable means may be utilized for retaining the fingers in their displaced position and/or they may be held in place by putting them under pointers of indicator 5.

The device of the present invention may be constructed of any suitable material, such, for example, as paper, cardboard, sheet metal, plastic, etc. The only limitation is that the portion of the fingers adjacent the disc 1 must be capable of being flexed without being defomed or destrnyed. If the fingers are fabricated from material which will retain the position to which they are displaced, the securing means for the fingers is not required.

In selecting color harmonies that are pleasing to the eye it is important not only to balance the colors of the spectrum, but it is equally important to consider how the eye sees these colors. In the visual appearance of color the greatest stimulation for the eye occurs near the center of the spectrum in the yellow-green color region. The yellow-green color region of the spectrum has a wave length of 555 milli-microns. Colors in the spectrum adjacent to this yellow-green region have high visibility for the eye, the relative brightness rapidly diminishing toward both the red and blue-violet ends of the spectrum. This yellow-green section, therefore, is considered as the portion of the spectrum with a maximum visibleness of 100%. Using this percentage as a criterion, it is possible to list the energy responses of the remainder of the colors in the spectrum in relation to this maximum percentage.

As a further aid in harmonious color selection the top face of the fingers 7 as well as the top face of the fingers 2 and 8 contain additional information referring to the optical visibility of the spectrum color in terms of percentages. In this manner when a combination of colors is selected, their total percentage of optical visibility may be quickly calculated.

The device of the present invention may be utilized in selecting colors for any application as, for example, in selecting the colors for the furnishings of a home, clothing accessories, photography or as an aid in painting. For example, better results can be obtained when the percent of visibility of colors is known before using light meters, flash lights, lens adjustments, filters, or film developing formulas.

Once the device is assembled the indicator 5 is rotated to one of the colors desired and the fingers coinciding with the other indicia of the indicator are then bent inwardly to indicate the color on the underside of the finger. The colors exposed in this selection process constitute two or more colors which when used together result in a color combination which is both harmonious and pleasing.

What has been disclosed is a device which permits harmonious colors to be easily and rapidly selected without any prior knowledge of colors, permits the viewing of the colors selected without detraction by the presence of other colors and which will permit the selection of various harmonies of colors by simply interchanging the indicating element or turning the indicator to the different colors of the spectrum, tints or shades.

It is to be understood that only one form of the invention has been discussed for purposes of description and that the invention is not to be limited by the specific structure disclosed. The device of the present invention is capable of many modifications in structure and design without departing from the spirit of the invention except as limited by the scope of the appended claims.

I claim:

1. A mechanical color guide adapted to select a group of harmonious colors from an array of spectrum colors, said guide comprising a disc provided with a plurality of fingers extending radially from the outer periphery of said disc, the under surface of said fingers being covered with the different colors of said array, the upper surfaces of said fingers bearing indicia identifying said colors, said fingers being bendable to overlap said disc, and an indicator element rotatably mounted on said disc and having at least two radially extending pointers, said pointers having a predetermined angular displacement relative to each other whereby for any angular position of said indicator element said pointers are directed to color bearing fingers constituting a group of harmonius colors.

2. A mechanical color guide adapted to select a group of harmonious colors from an array of spectrum colors, said guide comprising a disc provided with a plurality of fingers extending radially from the outer periphery of said disc, the under surface of said fingers being covered with the different colors of said array, the upper surfaces of said fingers bearing indicia identifying said colors, a background disc removably attached to said disc, said fingers being bendable to overlap said background disc, and an indicator element rotatably mounted on said background disc and having at least two radially extending pointers, said pointers having a predetermined angular displacement relative to each other whereby for any angular position of said indicator element said pointers are directed to color bearing fingers constituting a group of harmonious colors.

3. A mechanical color guide adapted to select a group of harmonius colors from an array of spectrum colors, said guide comprising a disc provided with a plurality of fingers extending radially from the outer periphery of said disc in star-like arrangement, said fingers being angularly displaced relative to each other, the under surface of said fingers being covered with the different colors of said array, the upper surfaces of said fingers bearing indicia identifying said colors, said fingers being bendable to overlap said disc, means for retaining said fingers in said displaced position, and an indicator element rotatably mounted on said disc and having a plurality of radially extending pointers, said pointers having a predetermined angular displacement relative to each other whereby for any angular position of said indicator element said pointers are directed to color bearing fingers constituting a group of harmonious colors.

4. A mechanical color guide adapted to select a group of harmonious colors from a plurality or arrays of spectrum colors, said guide comprising a multi-ply stack constituted by a plurality of superimposed discs each provided with a multiplicity of fingers extending radially from the periphery thereof, the fingers of said discs occupying corresponding angular positions, the under surface of said fingers of each ply being covered with a given array of different colors from among said plurality of arrays, the upper surfaces of said fingers of each ply bearing indicia identifying said colors, said fingers being bendable to overlap said uppermost disc, and an indicator element rotatably mounted on said uppermost disc and having a plurality of radially extending pointers, said pointers having a predetermined angular displacement relative to each other whereby for any angular position of said indicator element said pointers are directed to color bearing fingers constituting a group of harmonious colors.

5. A mechanical color guide adapted to select a group of harmonious colors from a plurality of arrays of spectrum colors, said guide comprising a multi-ply stack constituted by a plurality of superimposed discs each provided with a multiplicity of fingers extending radially from the periphery thereof in star-like arrangement, said fingers being angularly displaced relative to each other, the fingers of said discs occupying corresponding angular positions, the under surface of said fingers of each ply being covered with a given array of different colors from among said plurality of arrays, the upper surfaces of said fingers of each ply bearing indicia identifying said colors, said fingers being bendable to overlap said uppermost disc, and an indicator element rotatably mounted on said uppermost disc and having a plurality of radially extending pointers, said pointers having a predetermined angular displacement relative to each other whereby for any angular position of said indicator element said pointers are directed to color bearing fingers constituting a group of harmonious colors.

6. A mechanical color guide adapted to select a group of harmonious colors from a plurality of arrays of spectrum colors, said guide comprising a multi-ply stack constituted by a plurality of superimposed discs each provided with a multiplicity of fingers extending radially from the periphery thereof in star-like arrangement, said fingers being angularly displaced relative to each other, the fingers of said discs occupying corresponding angular positions, the under surface of said fingers of each ply being covered with a given array of different colors from among said plurality of arrays, the upper surfaces of said fingers of each ply bearing indicia identifying said colors, said fingers being bendable to overlap said uppermost disc, means for retaining said fingers in said displaced position and an indicator element rotatably mounted on said uppermost disc and having a plurality of radially extending pointers, said pointers having a predetermined angular displacement relative to each other whereby for any angular position of said indicator element said pointers are directed to color bearing fingers constituting a group of harmonious colors.

References Cited in the file of this patent

UNITED STATES PATENTS

| | | |
|---|---|---|
| 974,924 | Schnebel | Nov. 8, 1910 |
| 1,327,005 | Young | Jan. 6, 1920 |
| 1,840,208 | Osborn | Jan. 5, 1932 |
| 1,964,260 | Jones | June 26, 1934 |
| 1,964,586 | Leland | June 26, 1934 |
| 2,229,025 | Keyes | Jan. 21, 1941 |
| 2,238,316 | Gaugler | Apr. 15, 1941 |
| 2,629,185 | Mulrane | Feb. 24, 1953 |

FOREIGN PATENTS

| | | |
|---|---|---|
| 686,714 | France | Apr. 15, 1930 |